US012276412B2

(12) United States Patent
Dachlan et al.

(10) Patent No.: US 12,276,412 B2
(45) Date of Patent: *Apr. 15, 2025

(54) FLAME PROTECTED OPTIC

(71) Applicant: Hubbell Incorporated, Shelton, CT (US)

(72) Inventors: Ivon Dachlan, Glasgow (GB); Paolo Camillo, Uddingston Glasgow (GB)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,660

(22) Filed: Oct. 5, 2023

(65) Prior Publication Data

US 2024/0035653 A1 Feb. 1, 2024

Related U.S. Application Data

(63) Continuation-in-part of application No. 17/574,249, filed on Jan. 12, 2022, now Pat. No. 12,038,154.

(60) Provisional application No. 63/251,350, filed on Oct. 1, 2021.

(51) Int. Cl.
*F21V 25/12* (2006.01)
*F21V 23/00* (2015.01)
*F21V 29/85* (2015.01)

(52) U.S. Cl.
CPC ............ *F21V 25/12* (2013.01); *F21V 23/005* (2013.01); *F21V 29/86* (2015.01)

(58) Field of Classification Search
CPC ........... F21V 15/01; F21V 29/70; F21V 25/12
See application file for complete search history.

(56) References Cited

U.S. PATENT DOCUMENTS 9,634,206 B1 4/2017 Miedema
12,038,154 B2 * 7/2024 Dachlan ................ F21V 19/003
2011/0141728 A1 6/2011 Russello et al.
2012/0087118 A1 4/2012 Bailey et al.
2016/0085022 A1 3/2016 Yang et al.
2016/0356475 A1 12/2016 Honda et al.
2017/0219200 A1 8/2017 Nolan et al.
2017/0307204 A1 10/2017 Cattoni
2020/0200335 A1 6/2020 Bullmer et al.

OTHER PUBLICATIONS

International Search Report and Written Opinion issued on Apr. 11, 2022, by the International Searching Authority in corresponding International Patent Application No. PCT/US2022/012142. (15 pages).

* cited by examiner

*Primary Examiner* — Karabi Guharay
(74) *Attorney, Agent, or Firm* — Robinson + Cole LLP

(57) ABSTRACT

Various embodiments described herein are directed to luminaire components that prevent flame transmission from the inside of a luminaire to the outside of a luminaire. In certain aspects, the luminaire can be used in an environment containing flammable gas, for example, in specialized lab work or testing applications. This application discusses components that can be used to prevent flame transmission from the inside of a luminaire to the outside of a luminaire, thereby yielding a flame encapsulating luminaire. Accordingly, the components and assemblies described herein can be safely integrated with systems that operate in the presence of flammable gas.

20 Claims, 10 Drawing Sheets

FLAME PROTECTED OPTIC

PRIORITY CLAIM

This application is a Continuation-In-Part of U.S. Non-Provisional application Ser. No. 17/574,249, filed Jan. 12, 2022, which claims priority to U.S. Provisional Patent Application No. 63/251,350, filed Oct. 1, 2021, the entire contents of which are hereby incorporated by reference.

BACKGROUND

The application relates to luminaires and components for luminaires.

Light fixtures, or luminaires, include electric light sources and provide an aesthetic and functional housing in both interior and exterior applications. Sometimes, where luminaires are used in environments containing flammable gas, legal regulations sometime require luminaires to qualify for safe use in such an environment. Qualification for safe use of the luminaire enclosure in an environment containing flammable gas may include a requirement that any flame resulting from ignition of flammable gas in the luminaire is encapsulated by the luminaire and prevented from reaching the exterior of the luminaire. That is, the requirement may be that the luminaire be flame encapsulating in that it is configured to encapsulate any flames originating within the luminaire.

SUMMARY

According to an exemplary example, a luminaire includes a flame encapsulating luminaire enclosure.

According to another example, a lens forms a seal around an LED using a cement to prevent flame transmission outside of the lens.

According to another example, a luminaire system includes a luminaire enclosure comprising a luminaire enclosure cover and a luminaire enclosure backing; a pcb board, disposed in the luminaire enclosure and including one or more light emitters; an LED protective lens array including a plurality of protective lenses overlaying the pcb board and over the one or more light emitters; and a luminaire flame protective lens disposed in the luminaire enclosure cover; wherein a luminaire cavity is defined within the luminaire enclosure between the protective lens array and the luminaire lens; wherein the LED protective lens array is configured to be secured to the pcb board such that the protective lenses overlay the one or more light emitters, and such that a mechanical seal that disallows a flame from travelling into or out of at least one of the protective lenses is formed between the LED protective lens array and the pcb board.

According to another example, an LED protective lens array includes a body having a surface; and a plurality of LED protective lenses extending from the body, each including an LED accommodating cavity; wherein the LED protective lens array is configured to be attached to a pcb board by way of an adhesive material applied to the surface and interacting with the pcb board; wherein the LED accommodating cavities are configured to overlay a plurality of individual LED elements disposed on the pcb board; and wherein attaching the LED protective lens array to the pcb board via the adhesive forms a mechanical seal between the LED protective lens array and the pcb board that disallows a flame from travelling into or out of at least one of the LED accommodating cavities when the LED protective lens array is attached to the pcb board.

According to another example, a flame protected luminaire enclosure includes a luminaire enclosure cover including a luminaire lens; an LED protective lens array including a plurality of protective lenses; a luminaire enclosure backing configured to be joined to the luminaire enclosure cover by an adhesive; a luminaire cavity defined by a space extending between the luminaire lens and the luminaire enclosure backing; wherein the size of the luminaire cavity is determined based on a flame encapsulating protective standard for enclosures; and wherein the LED protective lens array is configured to be secured to the luminaire enclosure backing over a pcb board by the adhesive such that the LED protective lenses form a mechanical seal against the pcb board that disallows a flame from travelling into or out of at least one protective lens of the LED protective lens array.

FIG. **3*a*** is a top view of an LED protective lens array.

FIG. **3*b*** is a side view of an LED protective lens array.

FIG. **3*c*** is an underside view of an LED protective lens array including flame path gaps.

Figure 4:
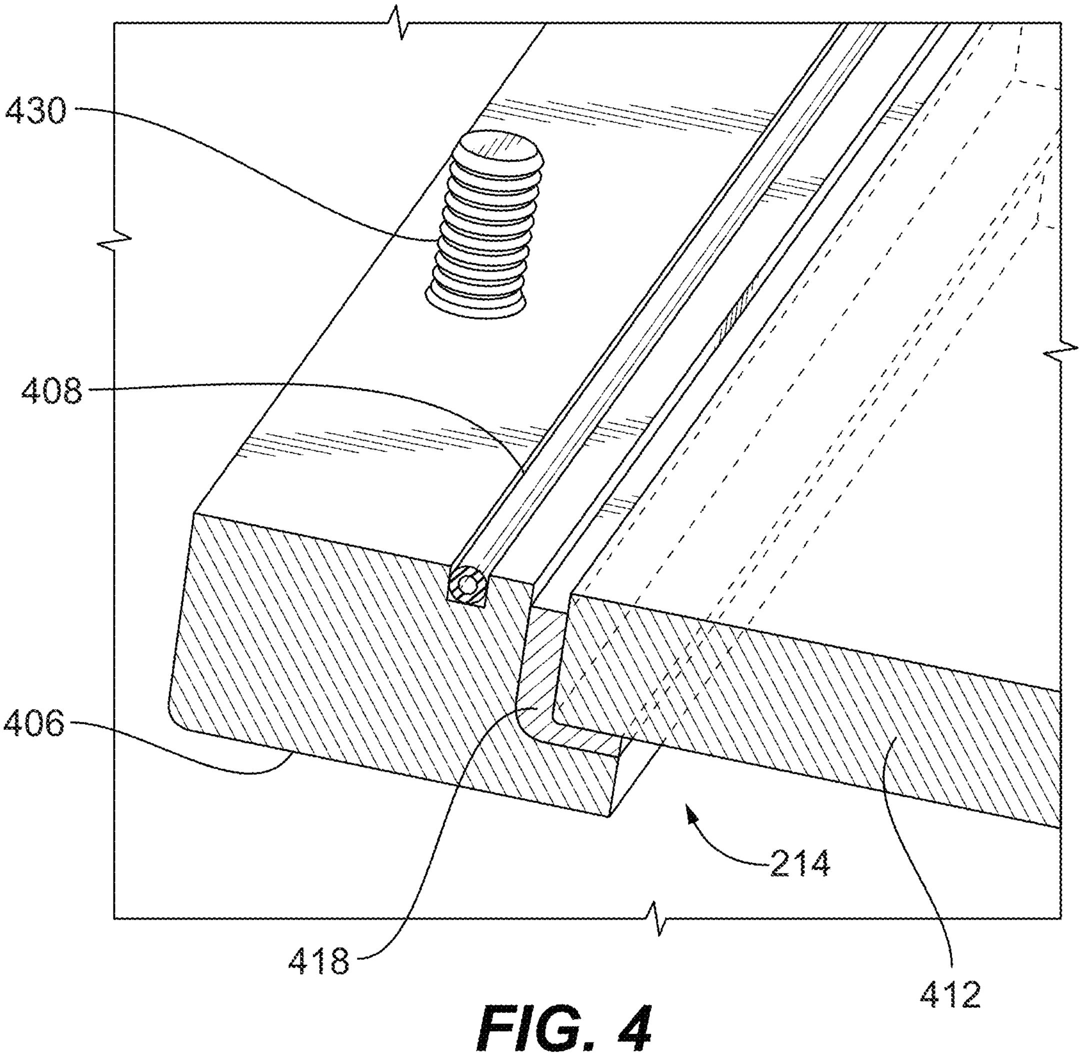

FIG. 4 is a detailed view of a luminaire lens securing structure of a luminaire enclosure cover.

FIG. **5*a*** is a top view of an LED protective lens array.

FIG. **5*b*** is an underside view of an LED protective lens array including flame path gaps.

FIG. **5*c*** is a side view of an LED protective lens array.

FIG. **5*d*** is a detailed view of a LED protective lens design.

FIG. **6*a*** is a perspective view of a luminaire comprising a flame encapsulating luminaire enclosure.

FIG. **6*b*** is a top view of a luminaire comprising a flame encapsulating luminaire enclosure.

FIG. **6*c*** is a sectional side view of a luminaire comprising a flame encapsulating luminaire enclosure.

FIG. **7*a*** is a perspective view of a luminaire comprising a flame encapsulating luminaire enclosure.

FIG. **7*b*** is a top view of a luminaire comprising a flame encapsulating luminaire enclosure.

FIG. **7*c*** is a sectional side view of a luminaire comprising a flame encapsulating luminaire enclosure.

FIG. **8*a*** is a perspective view of an LED protective lens array clamp plate.

FIG. **8*b*** is a perspective view of an LED protective lens array clamp plate.

FIG. **9*a*** is a top view of a standalone battery indicator light lens.

FIG. **9*b*** is a sectional side view of a standalone battery indicator light lens.

Figure 10:
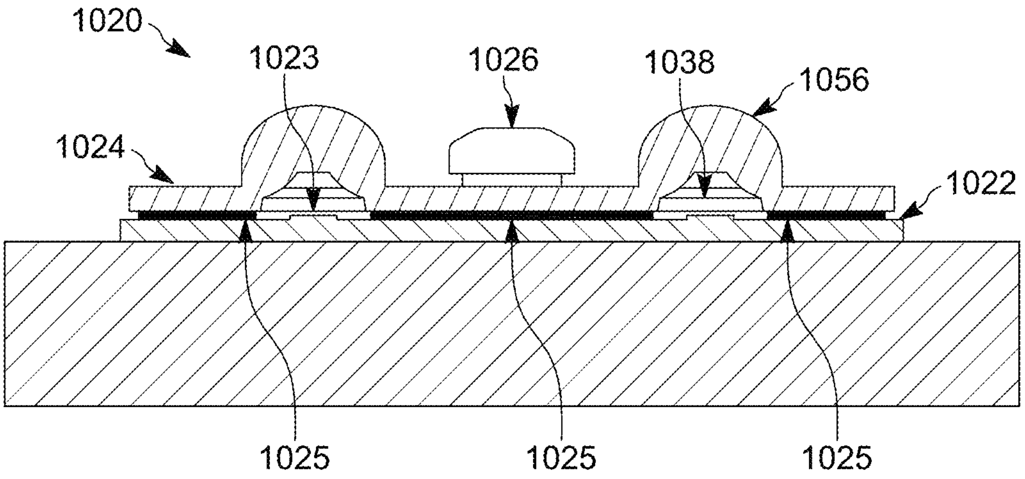

FIG. 10 is a sectional side view of an LED array according to another example.

Figure 11:
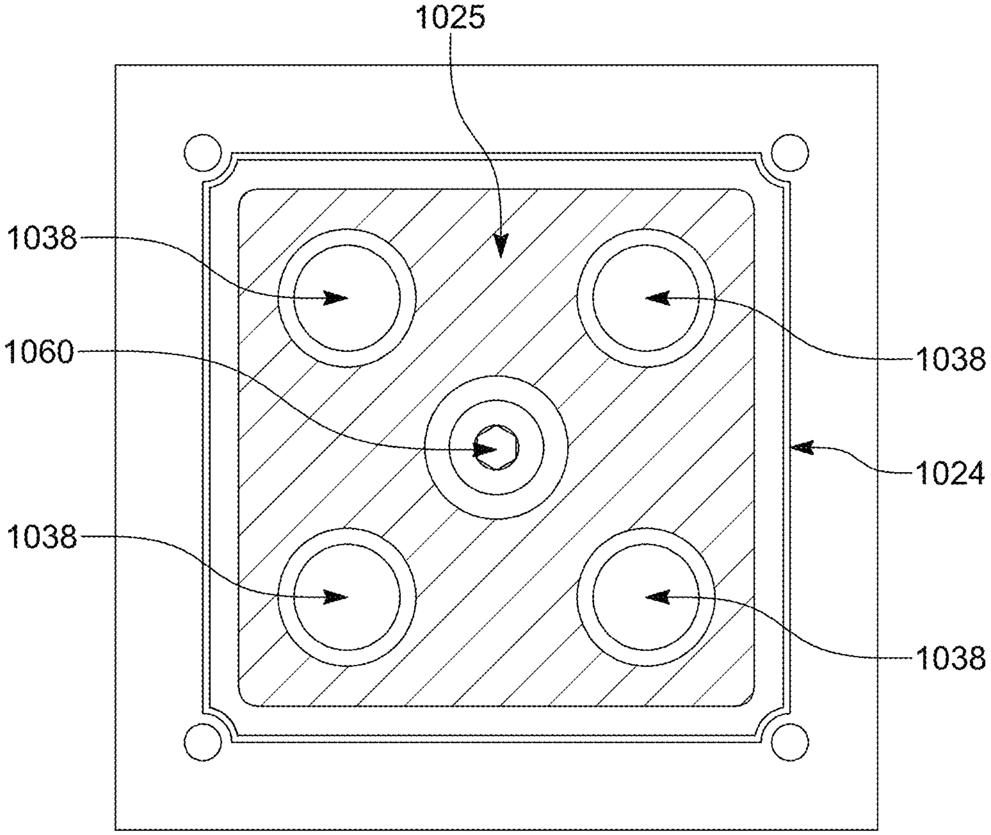

FIG. 11 is a bottom view of an LED protective lens array of the LED array of FIG. 10.

DETAILED DESCRIPTION

Before any embodiments are explained in detail, it is to be understood that embodiments described and illustrated are not limited in their application to the details of construction and the arrangement of components set forth in the following description or illustrated in the following drawings. The embodiments described and illustrated may be practiced or carried out in various ways and other embodiments are possible.

Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. As used within this document, the word "or" may mean inclusive or. As a non-limiting example, if it were stated in this document that "item Z may comprise element A or B," this may be interpreted to disclose an item Z comprising only element A, an item Z comprising only element B, as well as an item Z comprising elements A and B.

Various embodiments described herein are directed to luminaire components that prevent flame transmission from the inside of a luminaire to the outside of a luminaire. In certain aspects, the luminaire can be used in an environment containing flammable gas, for example, in specialized lab work, testing applications, or workspaces containing flammable gas. The luminaire may comprise a luminaire enclosure and include light emitter(s) configured to emit light directly through a luminaire enclosure lens. This application discusses components that can be used to prevent flame transmission from the inside of a luminaire to the outside of a luminaire, while allowing one or more light emitters of the luminaire to transmit light from the interior of the luminaire to the exterior of the luminaire thereby creating a flame encapsulating luminaire. A configuration of the luminaire light emitters and light emitter protective lenses may be accomplished so that a lightweight, slim luminaire enclosure that prevents transmission of an internal flame to the exterior of the luminaire can be accomplished while still facilitating a transmission of light from the interior of the luminaire enclosure to the exterior of the luminaire enclosure. Accordingly, the components and assemblies described herein can be safely integrated with systems that operate in the presence flammable gas.

Figure 1:
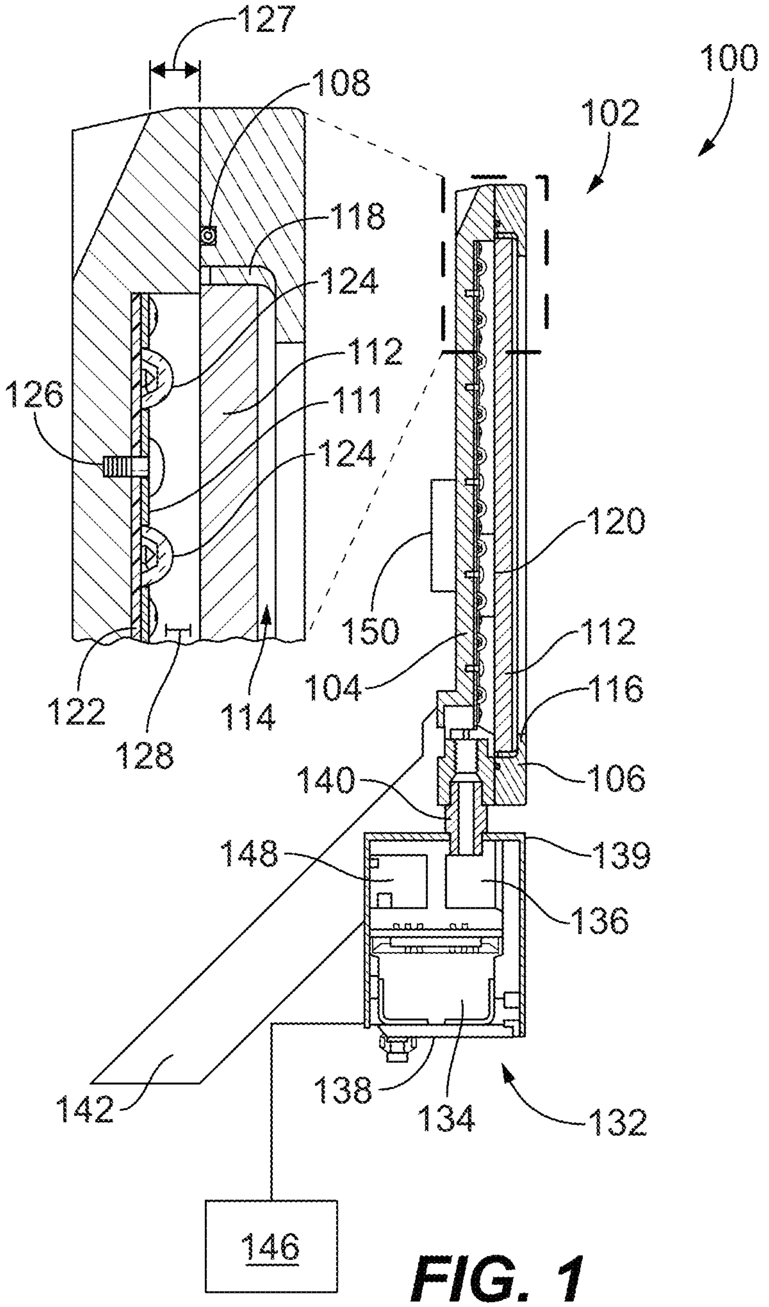
FIG. 1 is a sectional side view of a luminaire comprising a luminaire enclosure.

FIG. 1 illustrates a sectional side view of a redundantly flame encapsulating luminaire system 100 comprising a luminaire enclosure 102 including a luminaire enclosure backing 104 and a luminaire enclosure cover 106. The luminaire enclosure backing 104 and luminaire enclosure cover 106 are secured together in a manner that encapsulates any flame that may ignite within the luminaire enclosure 102 and thereby prevents any such flame from escaping the luminaire enclosure 102 at any point at which the luminaire enclosure backing 104 and luminaire enclosure cover 106 meet. Moreover, the luminaire enclosure 102, when assembled, is capable of fully encapsulating any flame that may ignite within the luminaire enclosure 102 according to a protective standard for enclosures. For example, the flame encapsulating protective standard of the luminaire enclosure 102 may be the Ex d standard.

In the embodiment shown, an encapsulating gasket 108 is disposed between the luminaire enclosure backing 104 and the luminaire enclosure cover 106, thereby further ensuring that no flame is transmitted from the inside of the luminaire enclosure 102 to the outside of the luminaire enclosure 102. The luminaire enclosure cover 106 includes a lens accommodating window 114 having at least an outer bezel lip 116. In the embodiment shown, the luminaire lens 112 is cemented into place within a lens accommodating window 114 of the luminaire enclosure cover 106, against the outer bezel lip 116, by a sealing agent 118. The sealing agent may be a silicone sealant adhesive but may include other sealing agents. A flame protected luminaire lens 112, disposed in the luminaire enclosure 102, allows light to be transmitted from the inside of the luminaire enclosure 102 to the outside of the luminaire enclosure 102 while also maintains the flame encapsulating protective standard of the luminaire enclosure 102.

In the embodiment shown, the plurality of LED arrays 120 is arranged on a pcb board 122. A plurality of LED protective lens arrays 124 are secured to the luminaire enclosure backing 104, through the pcb board 122. The LED protective lens arrays 124 are positioned over each of the LED arrays 120 and secured to the pcb board 122. The luminaire lens 112 is positioned at a distance from the LED protective lens arrays 124 and pcb board 122. In the embodiments shown, a spacer portion 127 of the assembled luminaire enclosure 102 defines a luminaire cavity 128 between the LED protective lens arrays 124 and the luminaire lens 112 by mechanically preventing the movement of the luminaire lens 112 and the pcb board 122 toward one another within the luminaire enclosure 102. When fabricating the luminaire enclosure 102, the volume of the luminaire cavity 128 may be strategically determined based on a particular flame encapsulating protective standard. For example, if the Ex d protection standard is applied, the volume of the luminaire cavity 128 is minimized when fabricating the luminaire enclosure 102. For example, to adhere to a particular flame encapsulating standard, the dimensions of the luminaire enclosure cover and the luminaire enclosure backing may be chosen so that the height of the luminaire cavity (i.e., the distance between the luminaire lens and the luminaire enclosure backing) is between 5 mm and 100 mm. Minimizing the volume of the luminaire cavity 128 while adhering to flame path and gap requirements imposed by the relevant flame encapsulating standard helps to reduce the required reference pressure that the luminaire enclosure 102 must withstand during an overpressure test—for example, under the Ex d protection standard, in particular. In the embodiment shown, the LED protective lens arrays 124 mitigates the transmission of flames resulting from the ignition of flammable gas under the LED protective lens arrays 124 while the luminaire lens 112 may be configured to prevent transmission, to the exterior of the luminaire enclosure 102, of any flame resulting from ignition of within the luminaire enclosure 102. Additionally, a LED protective lens array clamp plate 111 is positioned over the LED protective lens arrays and fastened to the luminaire enclosure backing by a mechanical fastener 126, thereby clamping the LED protective lens arrays 124 to the pcb board 122. The LED protective lens array clamp plate 111 may be rigid or flexible, and made of metal, ceramic, plastic, or any other heat resistant or flame-resistant material. The LED protective lens array clamp plate in secures the LED protective lens arrays 124 to the pcb board 122 so that no flames ignited under the LED protective lens array have breathing room to travel from under the LED protective lens array into the luminaire cavity 128. Therefore, in some embodiments, the entire luminaire enclosure 102 does not necessarily need to meet the relevant protective standard. That is, in some embodiments, only the LED protective lens arrays 124, pcb board 122 and LED protective lens array clamp plate 111, in combination, need to meet the relevant protective standard (e.g., Flame encapsulation, Ex d protection, Ex e protection, etc.).

In the embodiment shown, the luminaire enclosure backing 104 comprises a heat conductive material and acts as a heatsink for the pcb board 122. The luminaire enclosure backing 104 acts as a mounting surface for the pcb board 122 and may conduct heat to the luminaire enclosure backing 104 via the mechanical fasteners (not shown) or via surface contacts or heat pipes. In some embodiments, the entire luminaire enclosure 102 may be comprised of a lightweight, heat-conductive metal such as aluminum or titanium. In this way, the entire luminaire enclosure may be used as a heatsink for the LED arrays 120 and the pcb board 122 during operation of the luminaire system 100. In some embodiments, only certain parts, such as limited portions of the luminaire enclosure backing 104 and luminaire enclosure cover 106 comprise a heat-conductive material. In such embodiments, those certain parts may be used as localized heatsinks. A standalone heatsink 150 can be positioned in or on the luminaire enclosure 102 and draw heat from the LED arrays 120 during operation. However, in most cases, the luminaire enclosure 102 is constructed of a heatsinking material such as a heat conductive metal, and the luminaire enclosure 102, itself, may therefore act as a heatsink for the LED arrays 120 during operation.

In the embodiment shown, the luminaire system 100 includes a controls enclosure 132 that encloses a lighting gearbox 134 and an LED driver 136. Here, the controls enclosure 132 is also qualified to encapsulate flames ignited within the controls enclosure 132. That is, the controls enclosure 132 comprises a controls enclosure backing 138 and controls enclosure cover 139 that, when secured together, yield a seal or flame path that will prevent flames inside the controls enclosure 132 from reaching the outside of the controls enclosure 132 (e.g., Ex d protection qualified). In the embodiment shown, the controls enclosure 132 removably connects to the luminaire enclosure 102 via an adaptor 140. In some embodiments, the adaptor 140 connects the controls enclosure 132 to the luminaire enclosure 102 via electrical contacts. In other embodiments, the adaptor 140 connects the controls enclosure 132 to the luminaire enclosure 102 wirelessly. In still other embodiments, the adaptor 140 connects the controls enclosure 132 to the luminaire enclosure 102 via a removable or fixed wired connection.

In the embodiment shown, the lighting gearbox 134 is configured to perform analog regulation of an electrical input from a power source (not shown) and output a regulated electrical signal to the LED driver 136. The LED driver 136 may deliver an electrical signal to the LED arrays 120 based upon the regulated electrical signal received from the lighting gearbox 134, causing the LED arrays 120 to emit light.

One or more mounting components 142 may be disposed on one or more portions of the luminaire enclosure 102. The mounting components 142 are configured to secure the luminaire enclosure 102 to a rod, a cord, a chain, or any other known component or assembly for attaching a luminaire to a surface or hanging it therefrom. The mounting components 142 can also be configured to connect the luminaire enclosure 102 to a pole, post, ceiling, or other structure. Mounting components 142 may also include brackets having a pair of openings that receive fasteners to fasten the luminaire enclosure 102 to a wall. Similar mounting components can also be used to secure the controls enclosure 132 to a surface.

The LED driver 136 may be disposed in the luminaire enclosure 102, when present, or in the controls enclosure 132, when present. The, lighting gearbox 134 may be disposed in the luminaire enclosure 102 or in the controls enclosure 132, similarly. A power supply 146 may provide power to the luminaire enclosure 102 or controls enclosure 132 and in turn the pcb board 122, the LED driver 136 and the LED arrays 120. An LED driver 136 provides a power signal to the LED arrays 120, causing them to emit light. The power supply 146 may be any combination of drivers, ballasts, or other power supply depending on the type of LEDs in the LED arrays 120. The LED driver 136 may be a separate component or may be integrated with a light engine on the same circuit board as the LED arrays 120. For example, the power supply 146 may be a power signal corrector including components such as a voltage regulator or bridge rectifier. Additionally, the power supply 146 may be an onboard or externally connected battery. In certain aspects, the luminaire enclosure may be connected to power supply 146 or connected directly to line power (not shown).

One or more control components 148, may be connected to or integrated with the luminaire system 100. The control components 148 can include backup battery units, fuses, microprocessors, FPGAs, surge protectors, wired or wireless communication modules (e.g., CAT5, radio, Wi-Fi, etc.), sensors (e.g., light, occupancy, motion, heat, temperature, etc.), or any combination thereof. In some embodiments, the control components 148 include components facilitating the connection of the luminaire system 100 to a network that includes luminaire controllers, or one or more controllers for distributed communication and centralized control of the luminaire system 100.

Certain embodiments utilize reflectors, baffles, louvers or other optical features to direct light through the luminaire lens 112 during operation of the luminaire system 100. FIG. 1 shows an embodiment of a luminaire system 100 illustrated as a linear luminaire. In many embodiments, LED arrays 120 are positioned in the luminaire enclosure 102 and configured to emit visible light directly through the luminaire lens 112. However, in other embodiments, reflectors, louvers, fiber optics, or baffles may be used to transmit light emitted by the LED arrays 120 through the luminaire lens 112 indirectly.

In some embodiments, a luminaire enclosure cover 106 secures the luminaire lens 112 to the luminaire enclosure backing 104, by sandwiching the luminaire lens 112 between the luminaire enclosure cover 106 and luminaire enclosure backing 104 or an extension of either (e.g., 116) when the luminaire enclosure 102 is tightened closed by enclosure fasteners (not shown). In other embodiments, the luminaire lens 112 is not sandwiched between the luminaire enclosure backing 104 and the luminaire enclosure cover 106 when the enclosure is sealed by enclosure fasteners. Additionally, in some embodiments, the sealing agent cementing the luminaire lens 112 in or to the luminaire enclosure cover 106 can be replaced by mechanical fasteners, welds, etc. Similarly, in some embodiments, mechanical fasteners and enclosure fasteners may be replaced by adhesives, welds, etc. In other embodiments, the lens accommodating window 114 also includes an inner bezel lip (not shown). In such embodiments, the luminaire lens 112 may be retained between the outer bezel lip 116 and the inner bezel lip of the lens accommodating window 114. In most embodiments, the luminaire lens 112 is generally planar in shape, but it is contemplated that the luminaire lens 112 may take other shapes and that other configurations may be used, and that the combination of the means of securing the luminaire lens 112, may still be qualified for use in environments containing flammable gases or under a flame encapsulating protective standard. Additionally, the luminaire lens 112 can be plain or it can have optical features (e.g., frosting, textured surface, prisms, etc.) that alter or condition light emitted from a visible light emitter, such as a plurality of LED arrays 120. The luminaire lens 112 can also be used to address color mixing or color angle concerns.

In a number of embodiments, the encapsulating gasket 108 may not aid in encapsulating a flame and in some embodiments may not be present. For example, in some embodiments, the encapsulating gasket may be configured primarily to prevent the ingress of dust or liquid into the luminaire enclosure 102. As yet another example, in an embodiment including the luminaire enclosure 102, the encapsulating gasket 108 may be excluded from the luminaire enclosure 102 because, for a particular use of the luminaire system 100, there may be no need to prevent the ingress of dust or liquid into the luminaire enclosure 102.

In a number of embodiments, LED arrays 120 are not disposed in a redundantly flame-encapsulating luminaire system 100. In such cases, the LED arrays 120 may be sufficiently flame protected by the use of LED protective lens arrays 124. In some cases, LED protective lens arrays 124 may be secured to pcb board 122 over LED arrays 120. luminaire enclosure 102 may be entirely absent in such an embodiment, and LED protective lens array clamp plate 111 may be used in concert with LED protective lens arrays 124 to perform sufficient flame encapsulation to provide a flame-encapsulating luminaire system 106 without the use of luminaire enclosure 102. As another example, in embodiments lacking a luminaire enclosure 102, the encapsulating gasket 108 is not used in conjunction with the luminaire system 100. It is also contemplated herein that a single LED protective lens may be used, independent from an LED protective lens array 122, to provide flame encapsulation for a single LED or light emitter, with or without a luminaire enclosure 102, by using the approaches taught herein.

Figure 2:
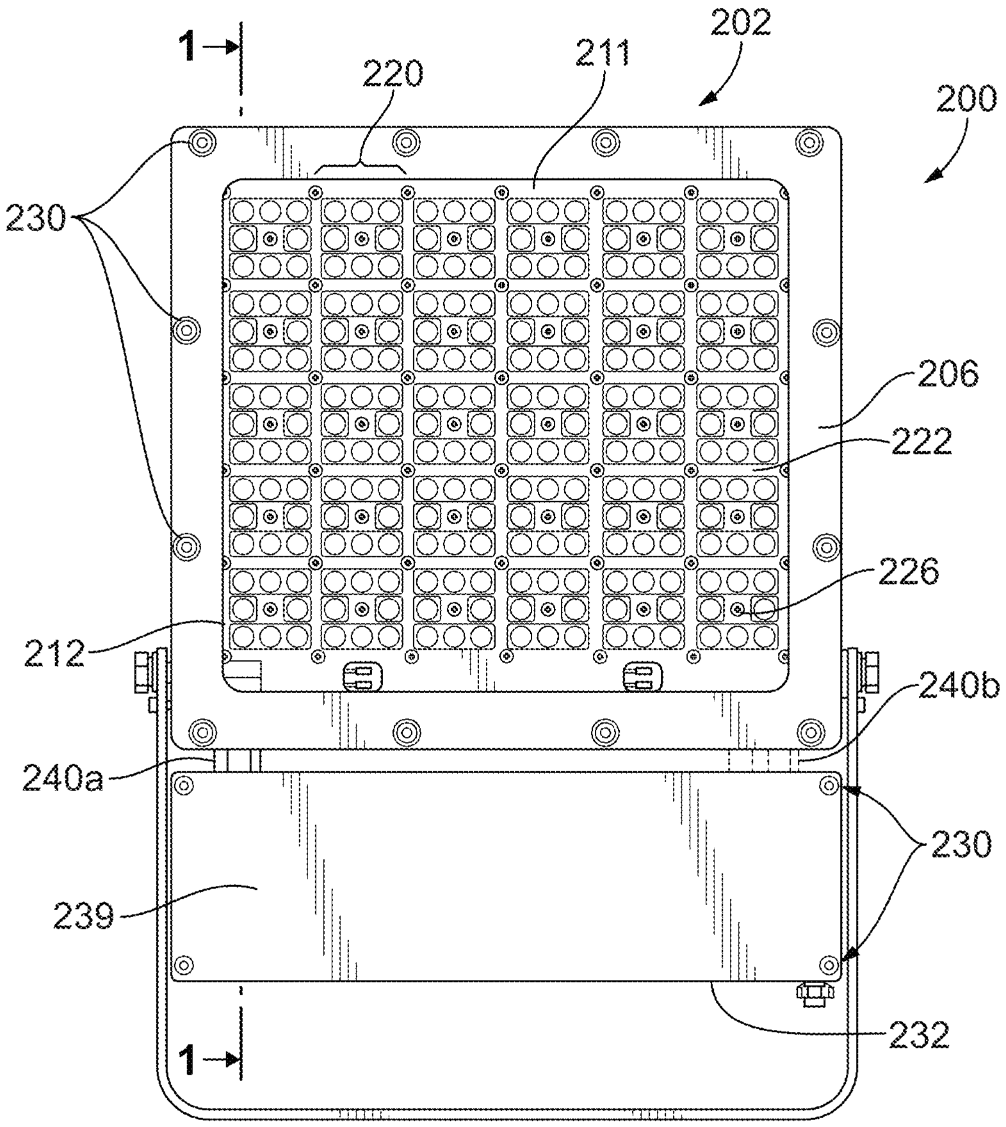
FIG. 2 is a front view of a luminaire comprising a luminaire enclosure.

FIG. 2 illustrates a front view of the luminaire system 200 including a luminaire enclosure 202. Enclosure fasteners 230 are positioned along the perimeter edge of the luminaire enclosure cover 206. The even spacing of enclosure fasteners 230 may help ensure a flame-tight seal of the luminaire enclosure cover 106 against the luminaire enclosure backing 104, when such a flame-tight seal is desired. Similarly controls enclosure fasteners 230 are positioned at the corners of the controls enclosure 232 and may likewise ensure a flame-tight seal between the controls enclosure backing 138 and the controls enclosure cover 239, when desired. Additionally, mechanical fasteners 226 sandwich the pcb board 122 between the LED protective lens array clamp plate 211 and the luminaire enclosure backing 104. In the embodiment shown, a plurality of LED arrays 220, is clearly visible, and configured to emit light directly through the luminaire lens 212, when powered. Additionally, adaptors 240*a*, 240*b* ensure redundant, direct communication between the luminaire enclosure 202 and the controls enclosure 232.

Figure 3:
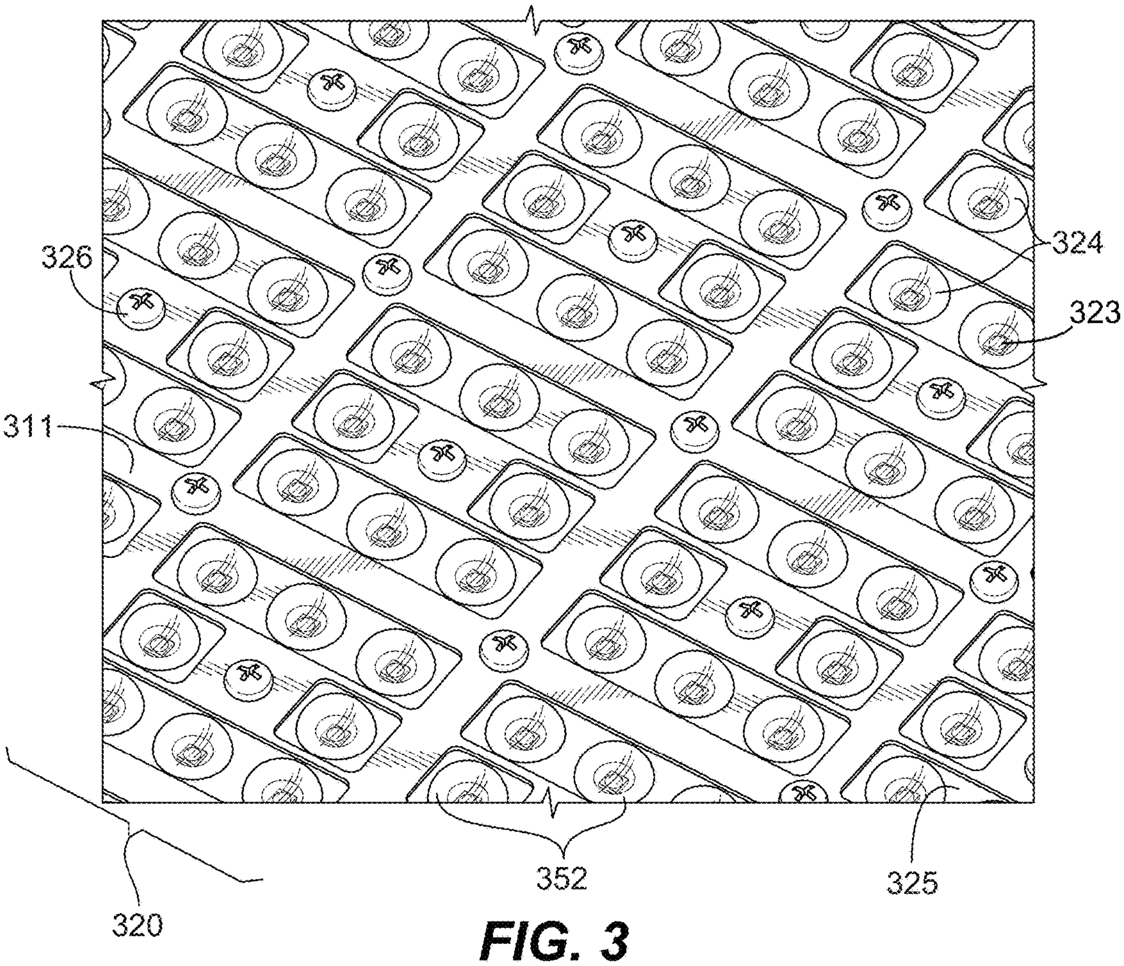
FIG. 3 is a view of a pcb board, LED array, and LED protective lens array configuration including flame path gaps.

FIG. 3 illustrates a closeup view of the LED arrays 320 within of the luminaire system 200 is shown. In the embodiment shown, the LED protective lens arrays 324 are tightly secured in over individual LED elements 323 of the LED arrays 320, by mechanical fasteners 226, 326, thereby creating a mechanical seal that disallows a flame from travelling into or out of any of the protective lenses 352, within the LED protective lens arrays 324. In some embodiments, rear surfaces opposite respective front surfaces 325 of the LED protective lens arrays 324 are cemented into place by an LED protective lens array sealing agent (see e.g., sealing agent 1025 in FIG. that aids in making each of the protective lenses 352, flame encapsulating. For example, the sealing agent may be a silicone sealant adhesive, but may include other sealing agents. In some embodiments, a flame-tight LED protective lens array gasket (not shown) may be used in conjunction with the LED protective lens arrays 324. In such cases, the LED protective lens arrays 324, may be pressed down onto the LED protective lens array flame-tight gasket, thereby creating the aforementioned flame-tight seal. LED protective lens array clamp plate 311 protects this arrangement and further ensures a flame-tight seal between the LED protective lens arrays 324, and the pcb board 222. This flame-tight seal is indirectly exhibited by flame path 354, shown in FIG. 3*c* on the underside of one of LED protective lens arrays 324. Further, the LED protective lens array clamp plate 311, protects the LED protective lens arrays 324 from deformation or movement during the ignition of any flammable gas within the luminaire enclosure 102, 202, or under the LED protective lens arrays 324.

Figures 3A, 3B, 3C:
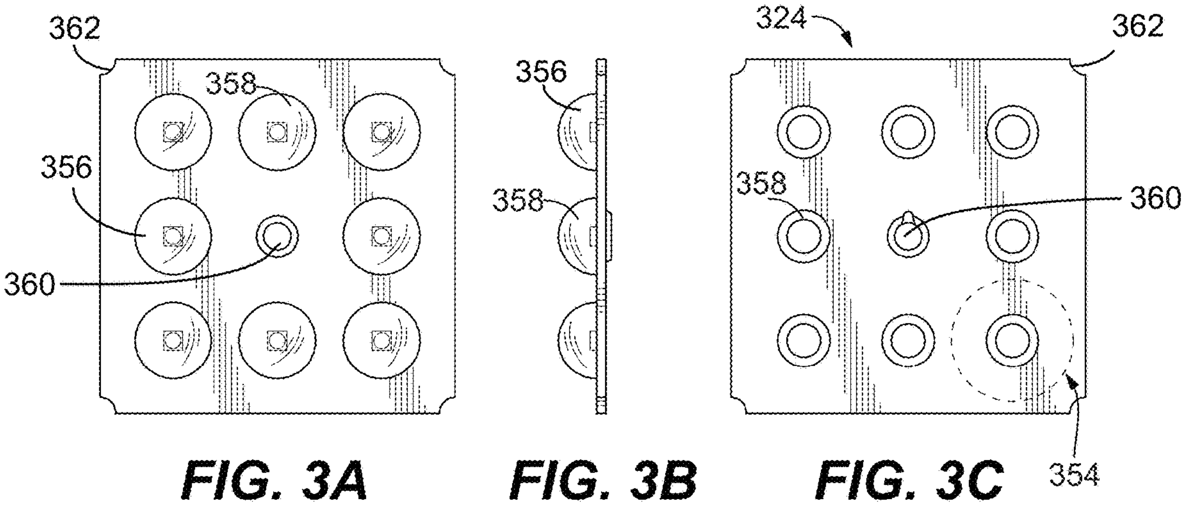

As shown in FIGS. 3*a*, 3*b*, and 3*c*, the LED protective lens array 324 includes eight LED protective lenses 356 in a 2×2 configuration. Each LED protective lens 356 includes an LED accommodating cavity 358. The LED protective lens array 324 also includes a center aperture 360 configured to receive the mechanical fastener 226. The LED protective lens array 324 also includes, at its corners, fastener accommodating cutouts 362. The LED protective lens array 324 is configured to be attached to the pcb board 222 by way of mechanical fasteners 126 interacting with the pcb board 222 via at least one of the center aperture 360 and the fastener accommodating cutouts 362. The LED accommodating cavities are 358 are configured to overlay and protect the individual LED elements 323 of the LED arrays 120 when the LED protective lens array 324 is placed onto the pcb board 222.

FIG. 4 illustrates a luminaire enclosure cover 406 including an encapsulating gasket 408 a luminaire lens 412 and one of enclosure fasteners 430. The luminaire enclosure cover 406 may be configured to ensure that the luminaire enclosure 202 is flame encapsulating when secured to the luminaire enclosure backing 104 according to the methods and products described herein. For example, in the embodiment shown, the sealing agent 418 cements the luminaire lens 412 into the lens accommodating window 214 of the luminaire enclosure cover 406. The sealing agent 418 may be flame-tight, and thereby create a flame-tight seal between the luminaire lens 112, 412 and the luminaire enclosure cover 406 that disallows flames from exiting the luminaire enclosure 202 between the luminaire lens 112, 412 and the luminaire enclosure cover 406. Similarly, in some embodiments, an encapsulating gasket 408 is flame-tight. In embodiments wherein the luminaire enclosure cover 106 is flame-tight, and the luminaire enclosure cover 106 is flame-tight and comprises an encapsulating gasket 408 the entire luminaire enclosure 202 becomes flame encapsulating when fastened together by the enclosure fasteners 430.

Figure 5A:
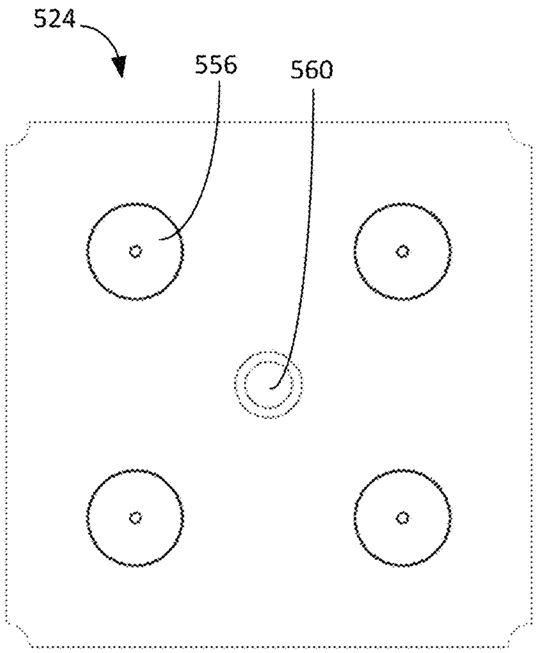
Figure 5B:
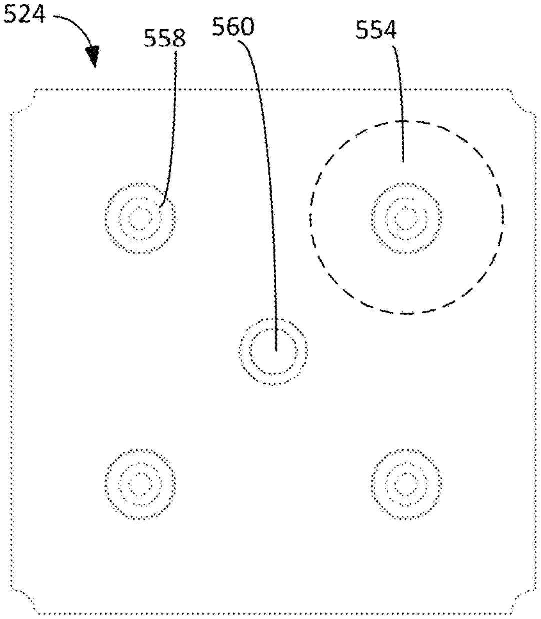
Figure 5C:
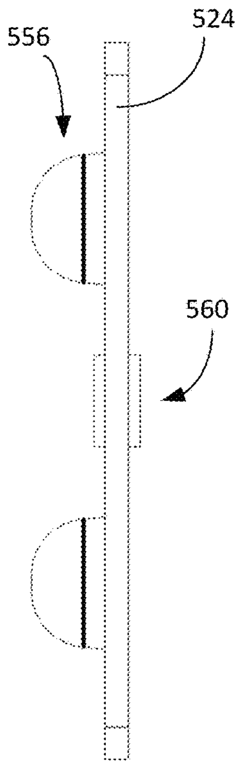

FIGS. 5*a*, 5*b*, and 5*c* illustrate a LED protective lens array 524 including four LED protective lenses 556 in a 2×2 configuration and a flame path 554. Each LED protective lens 556 includes an LED accommodating cavity 558. the LED protective lens array 524, and includes a center aperture 560 configured to receive the mechanical fastener 226. The LED protective lens array 524 also includes, at its corners, fastener accommodating cutouts 562 configured to be engaged by a mechanical fastener 126. The LED protective lens array 524 is configured to be attached to the pcb board 222 by way of mechanical fasteners 126 interacting with the pcb board 222 via at least one of the center aperture 560 and the fastener accommodating cutouts 562. The LED accommodating cavities are 558 are configured to overlay and protect the individual LED elements 323 of the LED arrays 120 when the LED protective lens array 524 is placed onto the pcb board 222.

Figure 5D:
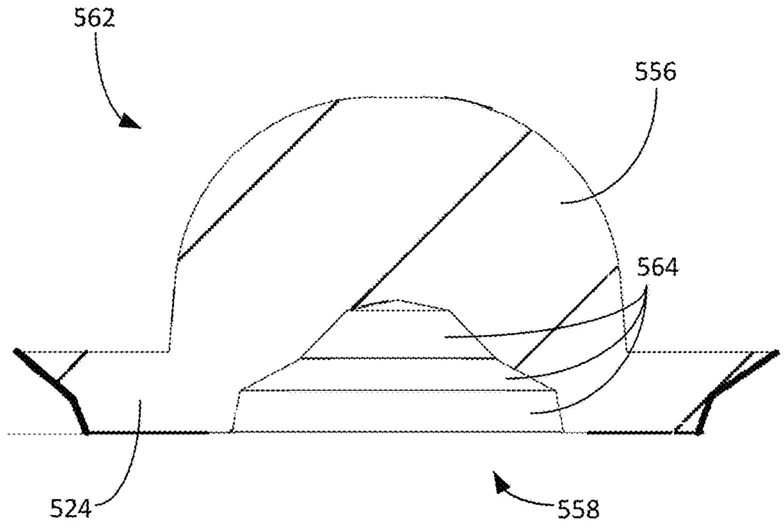

FIG. 5*d* illustrates a cross-section 562 of an embodiment of the led protective lens 556. In the embodiment shown, the LED accommodating cavity 558 includes plurality of inner walls 564 forming tiered, concentric, conical cavities of differing slopes, diameters, and heights. In the embodiment shown, the outermost wall of the plurality of inner walls 564 has a diameter of 6.7 millimeters and a height of 0.84 millimeters; a second wall, just above the outermost wall, has a diameter of 6.37 millimeters and rises 0.64 millimeters above the outermost wall; a third wall, just above the second wall has a diameter of 3.97 millimeters and rises 1 millimeter above the second wall; lastly, a final wall, just above the third wall, rises 0.21 millimeters above the third wall, has a diameter of 2.06 millimeters, and comes to a closed, conical apex in the center of the LED accommodating cavity 558.

Figure 6A:
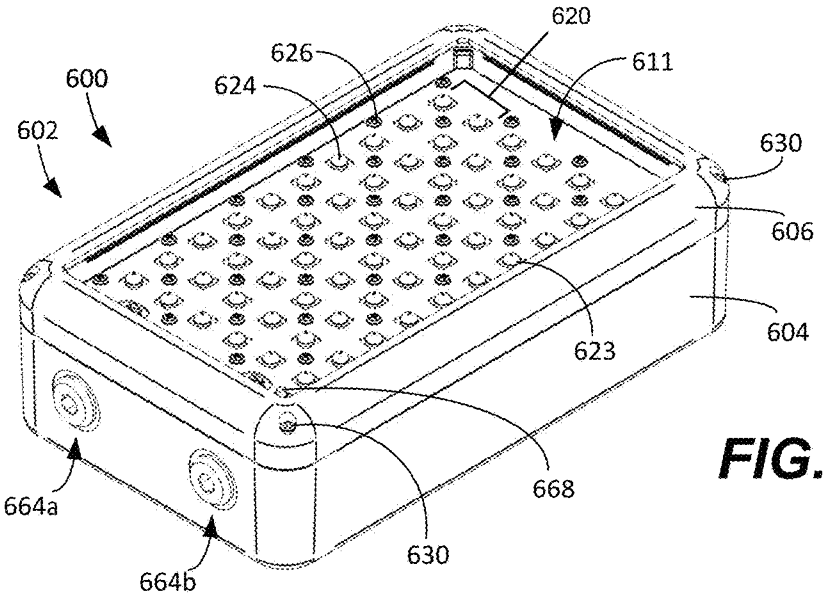
Figure 6B:
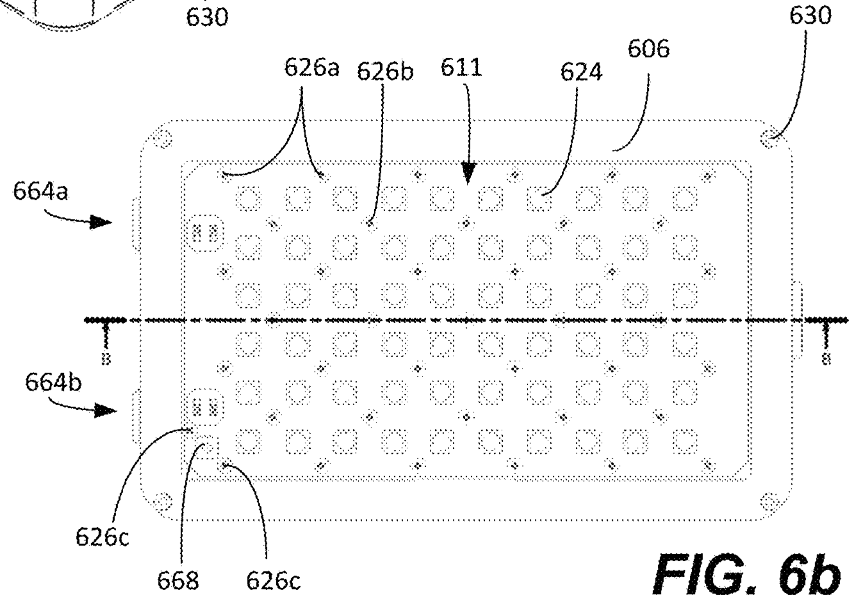

FIGS. 6*a* and 6*b* illustrate a perspective view and a top view, respectively, of the luminaire system 600 including a luminaire enclosure 602. Enclosure fasteners 630 (screws, in the embodiment shown) are positioned along the perimeter edge of the luminaire enclosure cover 606. The even spacing of enclosure fasteners 630 help ensure a flame-tight seal of the luminaire enclosure cover 606 against the luminaire enclosure backing 604. Additionally, mechanical fasteners 626*a*, 626*b*, 626*c* sandwich the pcb board 622 between the LED protective lens array clamp plate 611 and the luminaire enclosure backing 604. In the embodiment shown, a plurality of LED arrays 624 is configured to emit light through the luminaire lens 612 when powered. Additionally, adaptors 664*a*, 664*b* provide channels for an exterior power or data source (not shown) to communicate electronically with a control board (not shown) of the luminaire 602 or with the pcb board 622. For example, a controls enclosure 232 may be configured to communicate with the luminaire 602 via the adaptors 664*a*, 664*b* and control the LED arrays 62*o* or the individual LED elements 623. The luminaire 602 also includes a standalone battery indicator light 668 configured to indicate a condition of the battery (e.g., a low charge condition, a charged condition, a damaged condition). As will be discussed in further detail below, a standalone flame protected LED optic houses the standalone battery indicator light 668 and provides flame protection for the standalone battery indicator light 668.

Figure 6C:
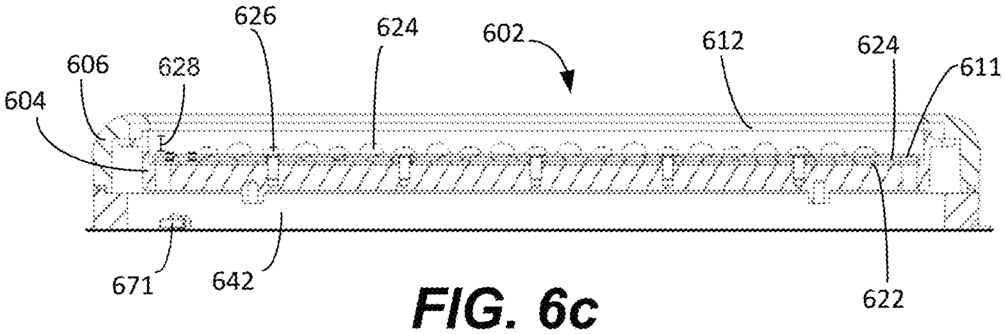

FIG. 6*c* illustrates a cross-section of the luminaire 602. In the embodiment shown, the luminaire 602 includes a hollow compartment 642 disposed on a backside of the luminaire enclosure backing 604. In the example shown, the hollow compartment 642 contains mounting equipment 671 configured to mount the luminaire enclosure backing 604 (and thereby the luminaire 602) to a surface (e.g., a wall, a ceiling, a doorway). The hollow compartment 642 may also be used for storage of electronic components (e.g., a battery, a controls circuit). In the embodiment shown, the volume of the luminaire cavity 628 is determined to prioritize flame protection. Accordingly, the volume of the luminaire cavity 628 is minimized when fabricating the luminaire enclosure 602 so that a flame occurring in the luminaire cavity 628 is accordingly contained.

Figure 7A:
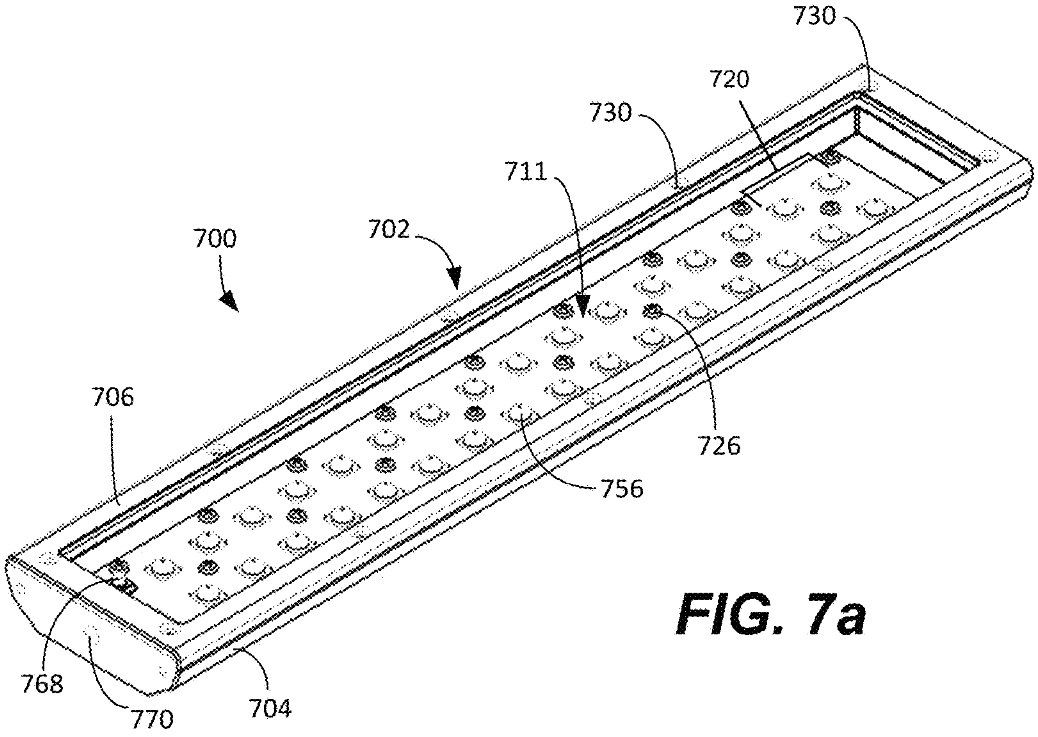
Figure 7B:
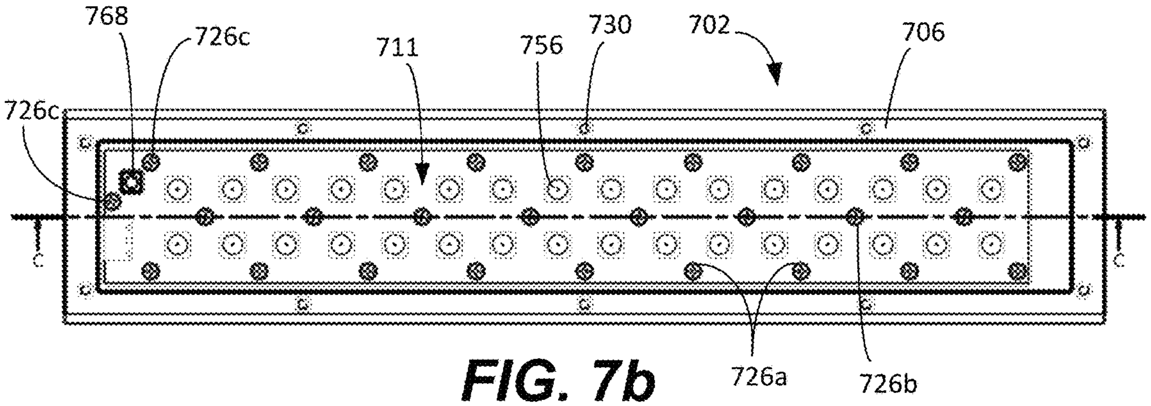

FIGS. 7*a* and 7*b* illustrate a perspective view and a top view, respectively, of another luminaire system 700 including a luminaire enclosure 702. Enclosure fasteners 730 are positioned along the perimeter edge of the luminaire enclosure cover 706. The even spacing of enclosure fasteners 730 help ensure a flame-tight seal of the luminaire enclosure cover 706 against the luminaire enclosure backing 704. Mechanical fasteners 726 fix the LED protective lens array clamp plate 711 over the pcb board 722 by mechanically engaging the luminaire enclosure backing 704 through the pcb board 722. For example, first mechanical fasteners 726*a* may be positioned along an edge of the lens array clamp plate 711, second mechanical fasteners 726*b* may be positioned along a center of the lens array clamp plate 711, and third mechanical fasteners 726*c* may be positioned proximate to a battery indicator light 768. In the embodiment shown, a plurality of LED arrays 720 is configured to emit light through the luminaire lens 712. Additionally, aperture 770 provides a way for an exterior power or data source (not shown) to communicate electronically with a control board (not shown) of the luminaire 702 or with the pcb board 722, as described above, with respect to FIG. 6. As with the luminaire of FIG. 6, the luminaire 702 includes the standalone battery indicator light 768 configured to indicate a condition of the battery (e.g., a low charge condition, a charged condition, a damaged condition).

Figure 7C:
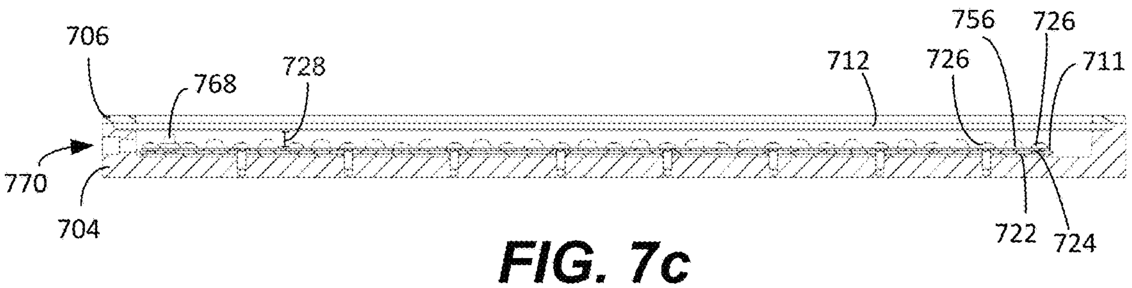

FIG. 7*c* illustrates a cross-section of the luminaire 702. In the embodiment shown, the luminaire 702 includes a slim enclosure cover 706 and a slim luminaire enclosure backing 704 joined together by enclosure fasteners 730 (pins, in the embodiment shown). In the embodiment shown, the volume of the luminaire cavity 628 is determined to prioritize flame protection according to a flame protection standard for enclosures. Accordingly, the volume of the luminaire cavity 728 is minimized when fabricating the luminaire enclosure 702 so that a flame occurring in the luminaire cavity 728 is accordingly kept relatively small. Aperture 770 is configured to maintain the flame protected status of the luminaire 702 by forming a flame-tight seal against the materials inserted therein (e.g., wires, a plug). In this way, the luminaire 702 may remain slim and while achieving flame protection as described herein.

Figure 8A:
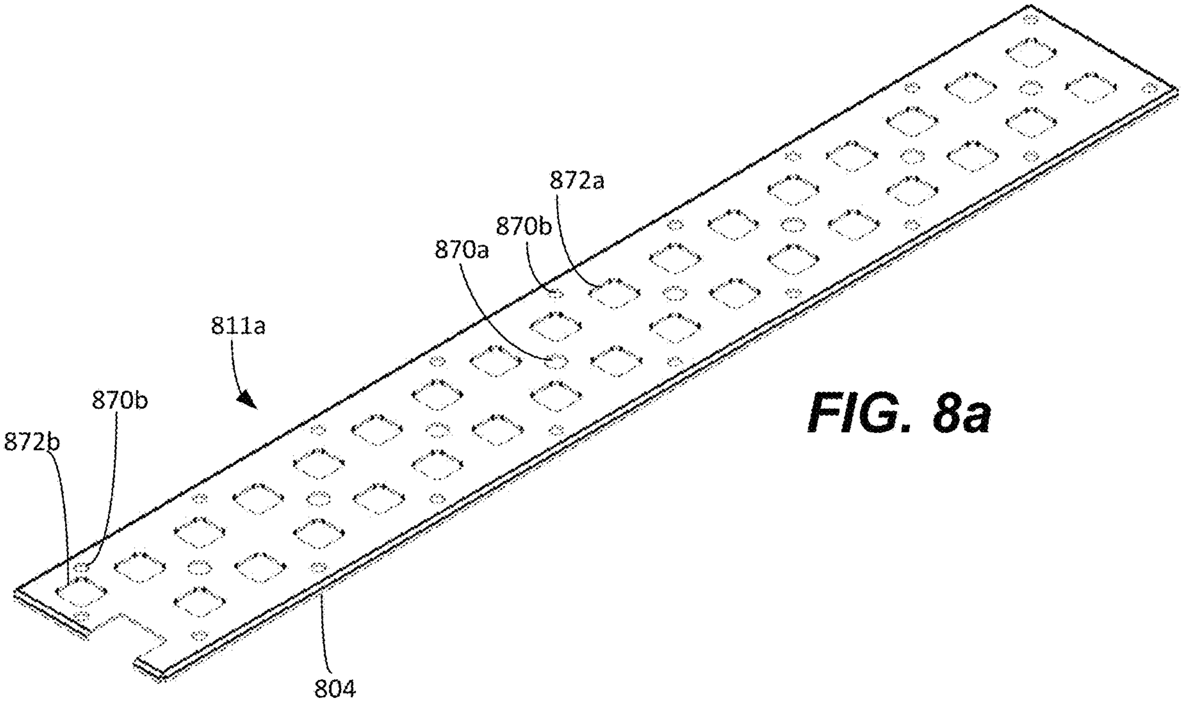
Figure 8B:
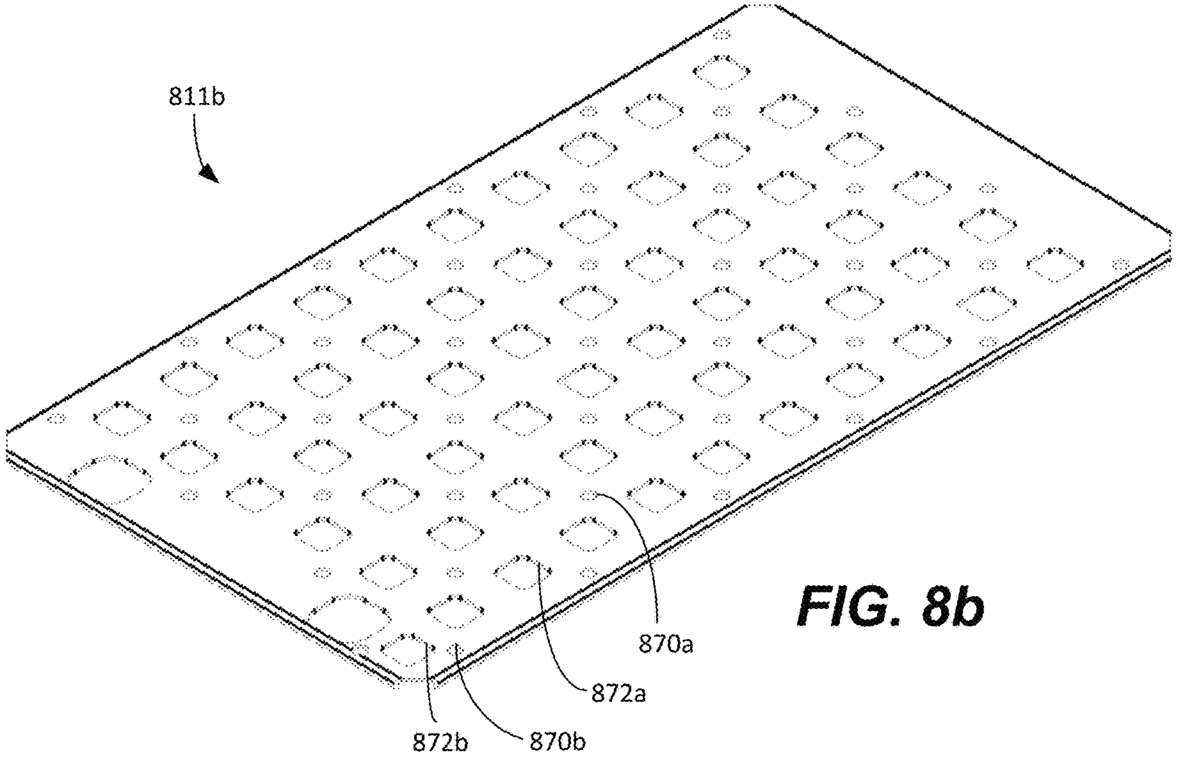

FIGS. 8*a* and 8*b* illustrate LED protective lens array clamp plates 811*a*, 811*b*. The LED protective lens array clamp plates 811*a*, 811*b* include fastener apertures 870*a*, 870*b* configured to receive mechanical fasteners 726 for the purpose of fastening the LED protective lens array clamp plates to the luminaire enclosure backing 804. The LED protective lens array clamp plates 811*a*, 811*b* also include a plurality of LED protective lens apertures 872*a*, 872*b* configured to receive a variety of LED protective lenses 756 therethrough when the LED protective lens array clamp plate 811*a* or 811*b* is fastened to the luminaire enclosure backing 704 and sandwiches the LED protective lens array 724 and pcb board 722 to the luminaire enclosure backing 704.

Figure 9A:
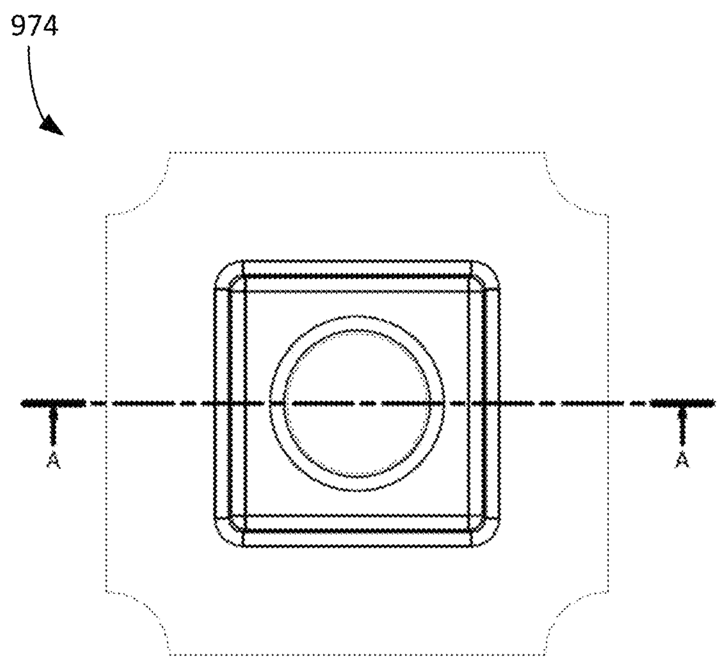
Figure 9B:
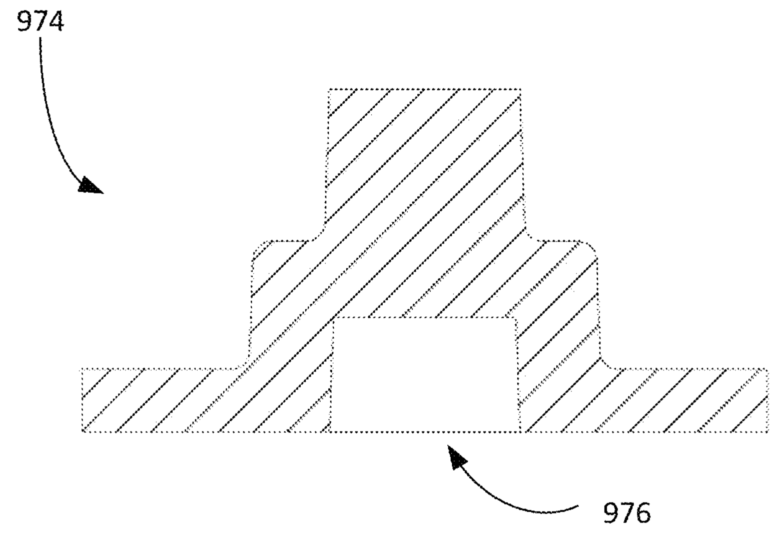

FIGS. 9*a* and 9*b* illustrate a standalone battery indicator light lens 974. The standalone battery indicator light lens 974 comprises an indicator light cavity 976 configured to receive a standalone battery indicator light 768 and to provide flame protection of the type described herein for the standalone battery indicator light 768 when clamped to the pcb board 722 via the LED protective lens array clamp plate 811*a*, 811*b*.

FIG. 10 illustrates a cross-sectional view of an LED array 1020 that may be used within the above-described luminaire system 100, 200. The LED array 1020 may include an LED protective lens array 1024 that is tightly secured over individual LED elements 1023. For example, the LED protective lens array 1024 may be cemented into place by an LED protective lens array sealing agent 1025.

FIG. 11 illustrates a sealing agent 1025 applied to a bottom view of the LED protective lens array 1024. The illustrated LED protective lens array 1024 may include four LED accommodating cavities 1038, arranged in a 2×2 configuration. Other amounts of LED accommodating cavities 1038 and/or orientations of the cavities 1038 may be used in other examples.

In the illustrated example, the sealing agent 1025 may be applied across substantially the entire bottom surface of the LED protective lens array 1024. In other examples, the sealing agent 1025 may be applied to selective portions of the LED protective lens array 1024. For example, the sealing agent 1025 may be applied on a portion of the LED protective lens array 1024 around each LED accommodating cavity 1038. This may form a seal around each LED accommodating cavity 1038 but may not require the entire surface to include the sealing agent 1025.

The sealing agent 1025 may be selected for its adhesive property to meet a particular standard requirement. For example, the sealing agent 1025 may be selected to seal the LED accommodating cavity 1038 and prevent transmission of gases in the IIC gas grouping (e.g., acetylene).

The sealing agent 1025 may be applied to a surface of the LED protective lens array 1024 prior to the LED protective lens array 1024 being attached to a pcb board 1022. Once the sealing agent 1025 is applied (and before it solidifies or hardens), the LED protective lens array 1024 may be positioned so that each protective lenses 1056 of the LED protective lens array 1024 is positioned over one of the LED elements 1023. The sealing agent 1025 may harden or solidify and seal each LED accommodating cavity 1038 of each respective protective lens 1056 individually. In other words, the sealing agent 1025 may separately form a seal (e.g., a mechanical seal) around each LED accommodating cavity 1038 (e.g., to hermetically seal each LED accommodating cavity 1038). Sealing around each LED accommodating cavity 1038 may prevent flame transmission outside of each LED accommodating cavity 1038. In other words, any flammable gas present within the individual LED accommodating cavity 1038 may be trapped within the respective LED accommodating cavity 1038 and is prevented from exhausting into an external environment and igniting.

In some forms, a mechanical fastener 1026 may positioned though a central aperture 1060 of the LED protective lens array 1024 to further secure the LED protective lens array 1024 to the pcb board 1022. Each illustrated LED protective lens array 1024 in the LED array 1020 may include a single mechanical fastener 1026. For example, a clamp plate (e.g., clamp plate in described above) may be omitted from this example. The sealing agent 1025 may provide sufficient seal to prevent flame transmission that a clamp plate is not required. However, a clamp plate may still be used with the sealing agent 1025 to provide additional sealing force depending on the size and requirements of the LED array 1020.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Modifications may be made to adapt a particular situation or material to the teachings of the disclosure without departing from the scope thereof. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present application, and are not intended to limit the structure of the exemplary embodiments of the present application to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed is:

1. A luminaire system comprising:
- a luminaire enclosure comprising a luminaire enclosure cover and a luminaire enclosure backing;
- a pcb board, disposed in the luminaire enclosure and including one or more light emitters;
- an LED protective lens array including a plurality of protective lenses overlaying the pcb board and over the one or more light emitters; and
- a luminaire flame protective lens disposed in the luminaire enclosure cover;
- wherein a luminaire cavity is defined within the luminaire enclosure between the protective lens array and the luminaire lens;
- wherein the LED protective lens array is configured to be secured to the pcb board such that the protective lenses overlay the one or more light emitters, and such that a mechanical seal that disallows a flame from travelling into or out of at least one of the protective lenses is formed between the LED protective lens array and the pcb board.

2. The luminaire system of claim 1, wherein the luminaire flame protected lens array is sealing coupled to the luminaire enclosure cover.

3. The luminaire system of claim 1, wherein:
- the luminaire flame protected lens includes a first lens surface and a second lens surface opposite to the first lens surface;
- the luminaire enclosure backing includes a first surface and a recessed portion that has a mounting surface for the pcb board, wherein the mounting surface is recessed relative to the first surface; and
- the first lens surface is sealingly connected to the enclosure cover and the second lens surface faces the mounting surface and the pcb board;
- wherein the luminaire cavity is formed between the mounting surface and the second lens surface; and
- wherein the second lens surface is flush with the first surface such that the depth of the recessed portion is substantially equal to the height of the luminaire cavity.

4. The luminaire system of claim 1, wherein
- the luminaire enclosure cover includes a lens accommodating window having an outer bezel lip and an inner bezel lip;

the luminaire lens is retained between the outer bezel lip and the inner bezel lip of the lens accommodating window;

the luminaire flame protected lens includes a first lens surface and a second lens surface opposite to the first lens surface;

the outer bezel lip contacts the first lens surface; and the inner bezel lip contacts the second lens surface.

5. The luminaire system of claim 1, wherein an adhesive is applied to at least a portion of the LED protective lens array and forms the mechanical seal.

6. The luminaire system of claim 5, wherein the adhesive is a cement.

7. The luminaire system of claim 1, wherein the pcb board is secured to the luminaire enclosure backing by a mechanical fastener, and wherein the protective lens array is further secured to the pcb board by the mechanical fastener.

8. An LED protective lens array comprising:

a body having a surface; and a plurality of LED protective lenses extending from the body, each including an LED accommodating cavity;

wherein the LED protective lens array is configured to be attached to a pcb board by way of an adhesive material applied to the surface and interacting with the pcb board;

wherein the LED accommodating cavities are configured to overlay a plurality of individual LED elements disposed on the pcb board; and wherein attaching the LED protective lens array to the pcb board via the adhesive forms a mechanical seal between the LED protective lens array and the pcb board that disallows a flame from travelling into or out of at least one of the LED accommodating cavities when the LED protective lens array is attached to the pcb board.

9. The LED protective lens array of claim 8, further comprising an aperture formed though the body, wherein the LED protective lens array is configured to be attached to the pcb board by way of a mechanical fastener interacting with the pcb board via the aperture.

10. The LED protective lens array of claim 8, wherein the LED protective lenses are in a rectangular configuration.

11. The LED protective lens array of claim 8, wherein the LED accommodating cavity includes a plurality of inner walls forming tiered, concentric, conical cavities of differing slopes, diameters, and heights.

12. The LED protective lens array of claim 8, wherein the plurality of LED protective lenses includes four LED protective lenses arranged in a 2×2 configuration.

13. The LED protective lens array of claim 8, wherein the adhesive is a cement.

14. A flame protected luminaire enclosure comprising:

a luminaire enclosure cover including a luminaire lens;

an LED protective lens array including a plurality of protective lenses;

a luminaire enclosure backing configured to be joined to the luminaire enclosure cover by an adhesive;

a luminaire cavity defined by a space extending between the luminaire lens and the luminaire enclosure backing;

wherein the size of the luminaire cavity is determined based on a flame encapsulating protective standard for enclosures; and wherein the LED protective lens array is configured to be secured to the luminaire enclosure backing over a pcb board by the adhesive such that the LED protective lenses form a mechanical seal against the pcb board that disallows a flame from travelling into or out of at least one protective lens of the LED protective lens array.

15. The flame protected luminaire enclosure of claim 14, further comprising a gasket disposed between the luminaire enclosure cover and the luminaire enclosure backing, wherein the gasket is disposed radially outside of an outer perimeter of the luminaire lens.

16. The flame protected luminaire enclosure of claim 14, further including a hollow compartment disposed on a backside of the luminaire enclosure backing, and wherein the hollow compartment further includes mounting equipment configured to mount the luminaire enclosure backing to a surface.

17. The flame protected luminaire enclosure of claim 14, wherein:

the luminaire lens includes a first lens surface and a second lens surface opposite to the first lens surface;

the luminaire enclosure backing includes a first surface and a recessed portion that has a mounting surface for the pcb board, wherein the mounting surface is recessed relative to the first surface; and the first lens surface is sealingly connected to the enclosure cover and the second lens surface faces the mounting surface and the pcb board;

wherein the luminaire cavity is formed between the mounting surface and the second lens surface; and wherein the second lens surface is flush with the first surface such that the depth of the recessed portion is substantially equal to the height of the luminaire cavity.

18. The flame protected luminaire enclosure of claim 14, wherein the adhesive is cement.

19. The flame protected luminaire enclosure of claim 14, wherein the mechanical seal is configured to hermetically seal around a perimeter of each lens of the plurality of protective lenses.

20. The flame protected luminaire enclosure of claim 14, wherein the luminaire enclosure cover includes a fastener accommodating aperture, and wherein the luminaire enclosure backing is configured to be joined to the luminaire enclosure cover by an enclosure fastener.

* * * * *